(12) United States Patent
Gommé et al.

(10) Patent No.: US 11,616,532 B2
(45) Date of Patent: Mar. 28, 2023

(54) NEAR-FIELD WIRELESS DEVICE

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/206,061

(22) Filed: Mar. 18, 2021

(65) Prior Publication Data
US 2022/0302960 A1    Sep. 22, 2022

(51) Int. Cl.
*H04B 5/00* (2006.01)
*H04B 1/3827* (2015.01)

(52) U.S. Cl.
CPC .......... *H04B 5/0031* (2013.01); *H04B 1/385* (2013.01)

(58) Field of Classification Search
CPC .............................. H04B 5/0031; H04B 1/385
USPC ........................................................ 455/41.1
See application file for complete search history.

(56) References Cited

U.S. PATENT DOCUMENTS

| | | | |
|---|---|---|---|
| 7,190,937 B1 * | 3/2007 | Sullivan | H04B 17/382 455/67.11 |
| 8,755,269 B2 | 6/2014 | Jollota | |
| 9,619,010 B1 * | 4/2017 | Marathe | G06F 1/3206 |
| 9,668,212 B2 | 5/2017 | Lee et al. | |
| 10,944,447 B1 | 3/2021 | Kerselaers et al. | |
| 2013/0281016 A1 | 10/2013 | McFarthing | |
| 2018/0015327 A1 * | 1/2018 | Lee | G06F 3/011 |
| 2019/0174239 A1 * | 6/2019 | Niklaus | H04R 25/558 |
| 2019/0246350 A1 | 8/2019 | Stein et al. | |
| 2019/0252919 A1 * | 8/2019 | Ogawa | H02J 50/20 |

FOREIGN PATENT DOCUMENTS

| | | |
|---|---|---|
| EP | 3273609 A1 | 1/2018 |
| WO | WO-2021007555 A1 | 1/2021 |

OTHER PUBLICATIONS

Wikipedia; "Time-division Multiple Access"; retreived from the Internet https://en.wikipedia.org/wiki/Time-division_multiple_access; 4 pages (Mar. 16, 2021).
Wikipedia; "Frequency-hopping Spread Spectrum"; retreived from the Internet https://en.wikipedia.org/wiki/Frequency-hopping_spread_spectrum; 5 pages (Mar. 16, 2021).
Wikipedia; "Carrier-sense Multiple Access"; retreived from the internet https://en.wikipedia.org/wiki/Carrier-sense_multiple_access; 3 pages (Mar. 16, 2021).
Prabh, K. Shashi et al.; "Opportunistic Packet Scheduling in Body Area Networks"; 8th European Conference on Wireless Sensor Networks, Bonn, Germany; 16 pages (Feb. 2011).
U.S. Appl. No. 17/339,022; 42 pages, filed Jun. 4, 2021.

* cited by examiner

*Primary Examiner* — Eugene Yun

(57) ABSTRACT

One example discloses a first near-field device, including: a controller configured to establish a near-field communications link with a second near-field device; wherein the controller is configured to monitor a characteristic of the near-field communications link; wherein the controller is configured to define a near-field transmission window based on the monitored characteristic; and wherein the controller is configured to delay transmission of a set of near-field signals to the second near-field device if a current time is not within the near-field transmission window.

25 Claims, 12 Drawing Sheets

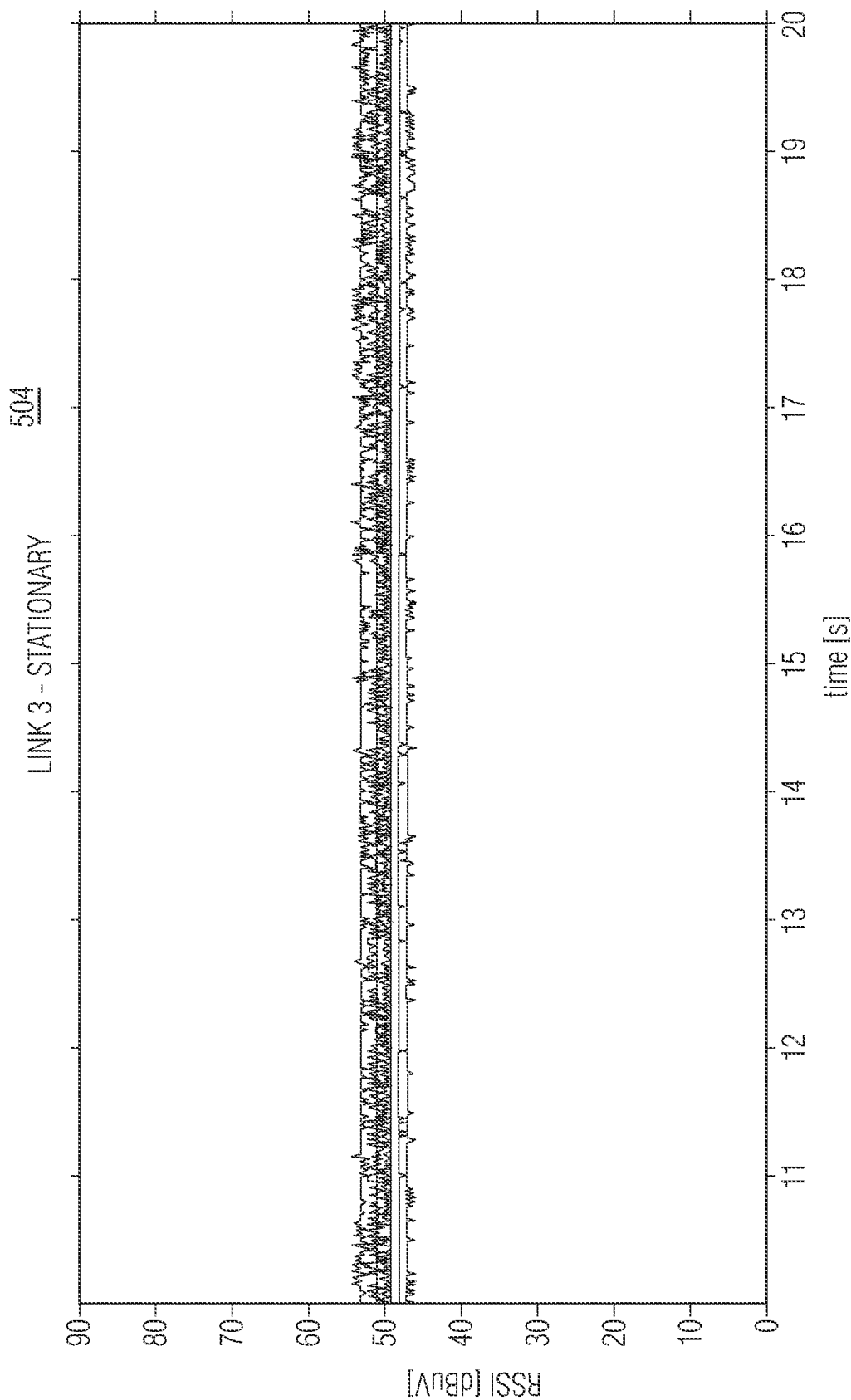

NEAR-FIELD WIRELESS DEVICE

The present specification relates to systems, methods, apparatuses, devices, articles of manufacture and instructions for near-field communications.

SUMMARY

According to an example embodiment, a first near-field device, comprising: a controller configured to establish a near-field communications link with a second near-field device; wherein the controller is configured to monitor a characteristic of the near-field communications link; wherein the controller is configured to define a near-field transmission window based on the monitored characteristic; and wherein the controller is configured to delay transmission of a set of near-field signals to the second near-field device if a current time is not within the near-field transmission window.

In another example embodiment, the controller is configured to define the window as a time period when the near-field communications link characteristic is above a threshold near-field communications link characteristic.

In another example embodiment, the controller is configured to define the window as a time period when the controller predicts that the near-field communications link characteristic will be above a threshold near-field communications link characteristic.

In another example embodiment, the controller is configured to define the window as a time period corresponding to a user movement when the near-field communications link characteristic was above a threshold near-field communications link characteristic.

In another example embodiment, the controller is configured to extract a set of features from the near-field communications link characteristic within the time period.

In another example embodiment, at least one of the features is a trigger feature found at a beginning of the time period.

In another example embodiment, the controller is configured to use the trigger feature to phase align the window with a beginning of the user movement.

In another example embodiment, the controller is configured to monitor the near-field communications link characteristic of the near-field communications link as a user moves.

In another example embodiment, the controller is configured to map variations in the near-field communications link characteristic to a specific type of user behavior.

In another example embodiment, the specific type of user behavior is at least one of: walking, moving arms, moving head, moving fingers, bending, stretching, jumping, swimming, rotating, swinging, holding a posture, meditating, or moving in relation to another user.

In another example embodiment, the controller is configured to instruct the user to perform the specific type of user behavior.

In another example embodiment, the characteristic of the near-field communications link is a received signal strength (RSS).

In another example embodiment, the characteristic of the near-field communications link is at least one of: a tuning parameter of a tuning circuit in the near-field device, data throughput in the near-field communications link, or a number of lost data packets in the near-field communications link.

In another example embodiment, the controller is configured to place the first near-field device in a low-power state if the current time is not within the near-field transmission window; and the controller is configured to take the first near-field device out of the low-power state if the current time is within the near-field transmission window.

In another example embodiment, the first near-field device includes a transceiver coupled to the controller and configured to transmit the set of near-field signals; controller is configured to command the transceiver to not transmit the set of near-field signals if the current time is not within the near-field transmission window; and the controller is configured to command the transceiver to transmit the set of near-field signals if the current time is within the near-field transmission window.

In another example embodiment, the first near-field device includes a power controller coupled to the controller and coupled to a power source; power controller is configured to turn-off the first near-field device if the current time is not within the near-field transmission window; and the power controller is configured to turn-on the first near-field device if the current time is within the near-field transmission window.

In another example embodiment, the first device and the second device are coupled to a single user.

In another example embodiment, the first device is coupled to a first user and the second device is coupled to a second user.

In another example embodiment, a center frequency of the near-field communications link is fixed.

In another example embodiment, the first near-field device further includes a front-end portion configured to translate controller communications into the near-field signals exchanged with the second near-field device; and the front-end portion includes, a near-field antenna having a first conductive surface and a second conductive surface; the conductive surfaces are configured to carry non-propagating quasi-static near-field electric-induction (NFEI) signals exchanged within the near-field communications link; and a tuning circuit coupled to the near-field antenna and having a set of tuning parameters and configured to adjust a resonant frequency and bandwidth of the near-field antenna.

In another example embodiment, the first near-field device further includes a front-end portion configured to translate controller communications into the near-field signals exchanged with the second near-field device; and the front-end portion includes, a near-field antenna having a coil; the coil is configured to carry non-propagating quasi-static near-field magnetic-induction (NFMI) signals exchanged within the near-field communications link; and a tuning circuit coupled to the near-field antenna and having a set of tuning parameters and configured to adjust a resonant frequency and bandwidth of the near-field antenna.

In another example embodiment, the first near-field device further includes a front-end portion configured to translate controller communications into the near-field signals exchanged with the second near-field device; and the front-end portion includes, a near-field antenna having a first conductive surface, a second conductive surface and a coil; the conductive surfaces are configured to carry non-propagating quasi-static near-field electric-induction (NFEI) signals exchanged within the near-field communications link; the coil is configured to carry non-propagating quasi-static near-field magnetic-induction (NFMI) signals exchanged within the near-field communications link; and a tuning circuit coupled to the near-field antenna and having a set of tuning parameters and configured to adjust a resonant frequency and bandwidth of the near-field antenna.

In another example embodiment, the user is at least one of: a robot, a vehicle, a docking system, a physical coupling system, a ticketing station, a security portal, and/or an assembly line device.

In another example embodiment, the near-field device is embedded in at least one of: a vehicle, a game controller, an amusement park ride, a medical device, an industrial station, or a robotic device.

According to an example embodiment, a method of enabling a first near-field device to be operated, comprising: distributing a set of instructions, stored on a non-transitory, tangible computer readable storage medium, for configuring the first near-field device; wherein the instructions include: establishing a near-field communications link with a second near-field device; monitoring a characteristic of the near-field communications link; defining a near-field transmission window based on the monitored characteristic; and delaying transmission of a set of near-field signals to the second near-field device if a current time is not within the near-field transmission window.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIGS. 5A, 5B and 5C are example graphs of near-field communications link characteristics corresponding to a set of stationary users wearing a pair of near-field devices.

Figure 1:
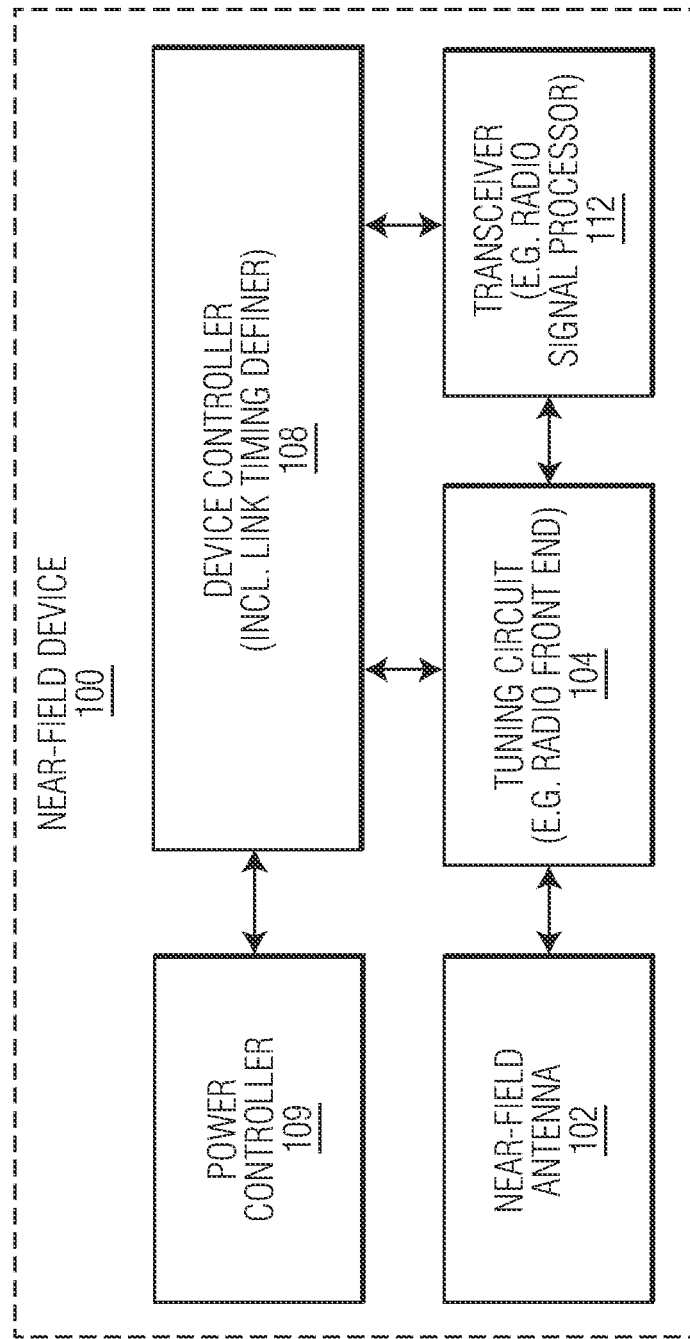
FIG. 1 is an example of a near-field device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless communications link drop-outs, attenuation, fading, shadowing etc. often results in not only missed data transfers, but also consumes limited resources of both a transmitter and receiver. Various approaches to ameliorating such concerns can include channel hopping and generating channel availability lists.

Channel hopping techniques detect loss of wireless synchronization on an initial wireless channel, obtains a measure of quality for the initial wireless channel, and then selects a new wireless channel when the obtained measure of quality fails to satisfy a threshold criteria.

Ordered availability lists of available wireless channels are generated in accordance with a quality measure of the wireless channels. Thus, when quality degradation associated with a first wireless channel is detected, the ordered list can be updated to indicate a lower preference for a wireless channel subject to attenuation and/or interference, and a higher preference for a second wireless channel that does not suffer from quality degradation.

These techniques all relate to abandoning channels that do not have a required quality.

Now discussed are near-field based wireless devices that analyze near-field communications link characteristics (e.g. channel behavior) between users in a WBAN (Wireless Body Area Network), especially when the devices are moving with respect to each other (e.g. either between two or more on-body devices, or one or more on-body and off-body devices), and generate a predictive near-field communications link characterization profile unique to each pair of near-field devices and unique to each user hosting such near-field devices. Near-field transmission windows are generated based on these monitored characteristics. Such near-field devices to be discussed can also maintain their current channel (e.g. frequency/bandwidth).

At least one advantage includes power savings from not transmitting or listening for a near-field signal when there is a predicted drop in the near-field communications link below a threshold level. Another advantage includes near-field device resource savings (e.g. processing cycles) such that the near-field device can engage in other tasks during the link drop time.

The near-field interactions between one or more near-field devices discussed herein can involve either on-body and/or off-body near-field devices. On-body devices are those near-field devices on a user's body or the body of a conductive surface. Off-body devices are defined with reference to the on-body devices and include any other near-field device that is not on-body as defined earlier.

These near-field devices can be based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in a first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, body is herein broadly defined to include at least: a human's body, an animal's body, a body of a living organism, a body structure of an inanimate object, a robot, a vehicle, a docking system, a physical coupling system, a station on an assembly line, and so on.

In a near-field device, an H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

Also in a near-field device, an E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

FIG. 1 is an example of a near-field wireless device 100. The example near-field wireless device 100 includes a near-field antenna 102, a tuning circuit 104 (e.g. radio front end), a device controller 108 (incl. a near-field link timing definer), power controller 109, and a transceiver circuit 112 (e.g. radio signal processor). An example of the near-field antenna 102 is presented and discussed in FIGS. 2A and 2B.

The tuning circuit 104 is configured to adjust the device's 100 resonance frequency using a capacitive bank (C-bank), and bandwidth using a resistive bank (R-bank) in response to signals from the transceiver circuit 112 and the device controller 108. The C-bank and R-bank discretes are in some examples about 130 pF and 5000 ohms respectively to support the required resonance frequency (e.g. 10.6 MHz) and bandwidth (e.g. 400 KHz). The device controller 108 is configured to adjust (e.g. increment/decrement) the C-bank and R-bank values using the tuning circuit 104.

The device controller 108 is configured to monitor and maintain the device's 100 operational resonance frequency and operational bandwidth/quality factor of the near-field signals (e.g. NFEI or NFEMI) carried by the near-field antenna. The device controller 108 is configured to adjust tuning parameters in the tuning circuit 104 if either the operational resonance frequency is different from a preselected resonance frequency and/or the operational bandwidth is different from a preselected bandwidth.

The device controller 108 is configured to monitor one or more near-field communications link characteristics (e.g. RSS (Received Signal Strength) and identify near-field communications link breakage and recovery time patterns in response to one or more user's behavior (e.g. movements), internal attributes (e.g. biological characteristics), and/or external attributes (e.g. ambient noise environment). This technique is herein defined as User Profile Driven Channel Access (UPDCA).

These near-field communications link characteristics, which may or may not have a periodicity, are then used to predict when a near-field communications link between a set of the near-field devices 100 will break and for how long so that the near-field device 100 conserves resources (e.g. power, processing, etc.) until the near-field communication link can be re-established. The identified near-field communications link characteristics can be stored in at least one of the near-field device's 100 memory.

In some example embodiments, at start-up (e.g. near-field device 100 initialization) the user connects two (or more) devices 100 onto their body (i.e. on-body) and performs a number of predefined movements and gestures (e.g. for 30 seconds). These movements can be instructed using a display on the near-field device 100 in some example embodiments, while in others the user can just begin a set of organic movements that near-field device 100 will automatically begin to identify and characterize, perhaps using an artificial intelligence (AI) algorithm. These near-field communications link characteristic variations based on these movements are then logged.

These characteristics can form an initial training data set of which is stored in the memory. This training set of near-field communications link characteristics can then be continuously adapted as the user continues to engage in the identified activity. In some example embodiments, there is no training period, and instead near-field communications link characterization is built in real-time based on successful and unsuccessful near-field signal communications (e.g. initially, or periodically, using acknowledgement signals to verify receipt of a data packet).

The device controller 108 is configured to delay near-field signal transmission until a predicted near-field communications link characteristic (e.g. RSS) threshold is reached. Such a delay can reduce power and resource consumption of the near-field devices 100 thereby enabling batteries in some example near-field devices 100 to last much longer, and or the near-field device 100 to complete other processing and/or computational tasks.

For example, the power controller 109 can be configured to place the near-field device 100 into a standby, hibernation, off, different mode, etc. state in response to a signal from the device processor 108 during times when near-field communications would be below the threshold characteristic. Thus, prior and/or real-time knowledge of such near-field communications link characteristics can be used to enable near-field communications in a more power-efficient way that can be particularly important for on-body devices 100 powered by batteries.

The device controller 108 can in some examples instruct at least one of the near-field devices 100 to transmit a polling signal as a first step toward re-establishing a near-field communications link between one or more pair of near-field devices 100.

While the near-field communications link characteristic of RSS is discussed herein, RSS is only one example of a near-field communications link characteristic. Other near-field communications link characteristics include: a tuning parameter of the tuning circuit 104, data throughput in the near-field communications link, or a number of lost data packets in the near-field communications link.

In one example embodiment, an RSS near-field communications link characteristic threshold is set to 40 dBuV to account for possible external/ambient random interference, such that the near-field devices 100 do not attempt to exchange data packets until after the RSS characteristic is above the threshold.

In some example embodiments, the device controller 108 defines a near-field transmission window (e.g. ON time) when the RSS is above the threshold and a wait/standby window (e.g. OFF time) when the RSS is below the threshold given. For example, the first user can have an ON time of 630 ms and an OFF time of 1020 ms, and the second user can have an ON time of 150 ms and an OFF time of 950 ms.

In some example embodiments, if a first device 100 A and second device 100 B communicate, the RSS received at A from B and received at B from A will be the same if the devices 100 are identical (same Tx voltage and antenna used at both sides). Then if the TX voltages are different or the antennas (i.e. their Tx and Rx gain) are different, a difference in dBs between the received signal strengths at the two nodes can occur. In such examples the near-field device 100 that has a lower RSS is used to define the near-field transmission window which is then stored in the near-field device 100 designated to reinitiate the near-field communications link after it rises back above the threshold RSS. The controller then chooses a time instance within the near-field transmission window in which to attempt to re-establish the near-field communications link.

In some example embodiments, if a link drop occurs, the first device 100 A (e.g. predefined as a primary device 100) will initiate a link re-establishment routine that selects a proper timing for sending a polling signal to the other secondary near-field device 100, based on the stored and updated RSS link characterized training profile and transmit the polling signal and subsequent data accordingly. To verify that the predicted near-field transmission window was correct, the secondary near-field device 100 B can reply with an acknowledge signal.

In case of more than two devices 100, a similar protocol can be used. In case of identical devices 100, if first device 100 A is the creator and communicates with second and third devices 100 B and C, then device 100 A can store the received signal strength from B and the received signal strength from C. Device 100 A initiates the link establishment and runs the algorithm to process the signal strength profile from B to extract the timing to communicate with B. And like wise device 100 A extracts a timing to communicate with C based on the received signal strength from C. The communication link between devices 100 A and B and between A and C will be exhibit different received signal strength profile.

Note, while example embodiments discussed herein refer to a "user", in alternate embodiments the near-field device 100 can be taken exclusive possession of by other items, entities, etc. such as by: a robot, a vehicle, a docking system, a physical coupling system, a station on an assembly line, and so on.

Figure 2B:
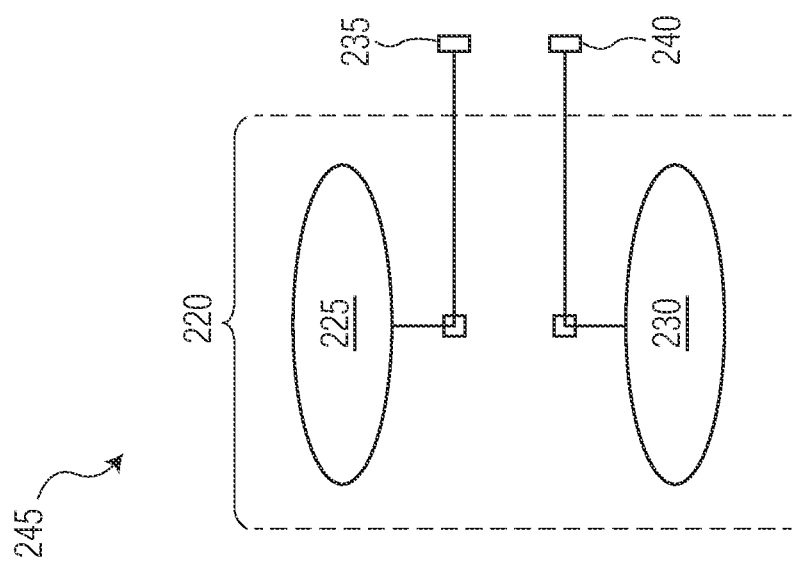
FIG. 2B is a second example near-field antenna in the wireless device.
Figure 2A:
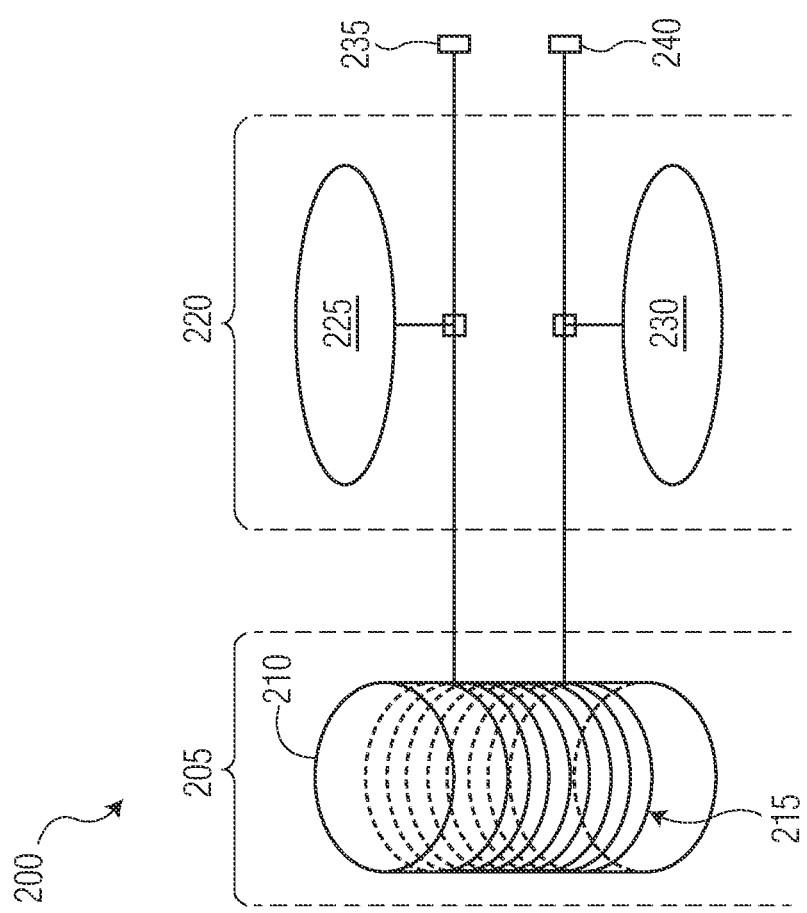
FIG. 2A is a first example near-field antenna in the wireless device.

FIG. 2A is a first example 200 near-field antenna in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

FIG. 2B is a second example 245 near-field (e.g. near-field electro induction (NFEI)) antenna in the wireless device 100. The second example near-field antenna 245 consists of just the short loaded dipole (E-field) antenna 220 portion of the first example near-field antenna 200.

Figures 3A, 3B:
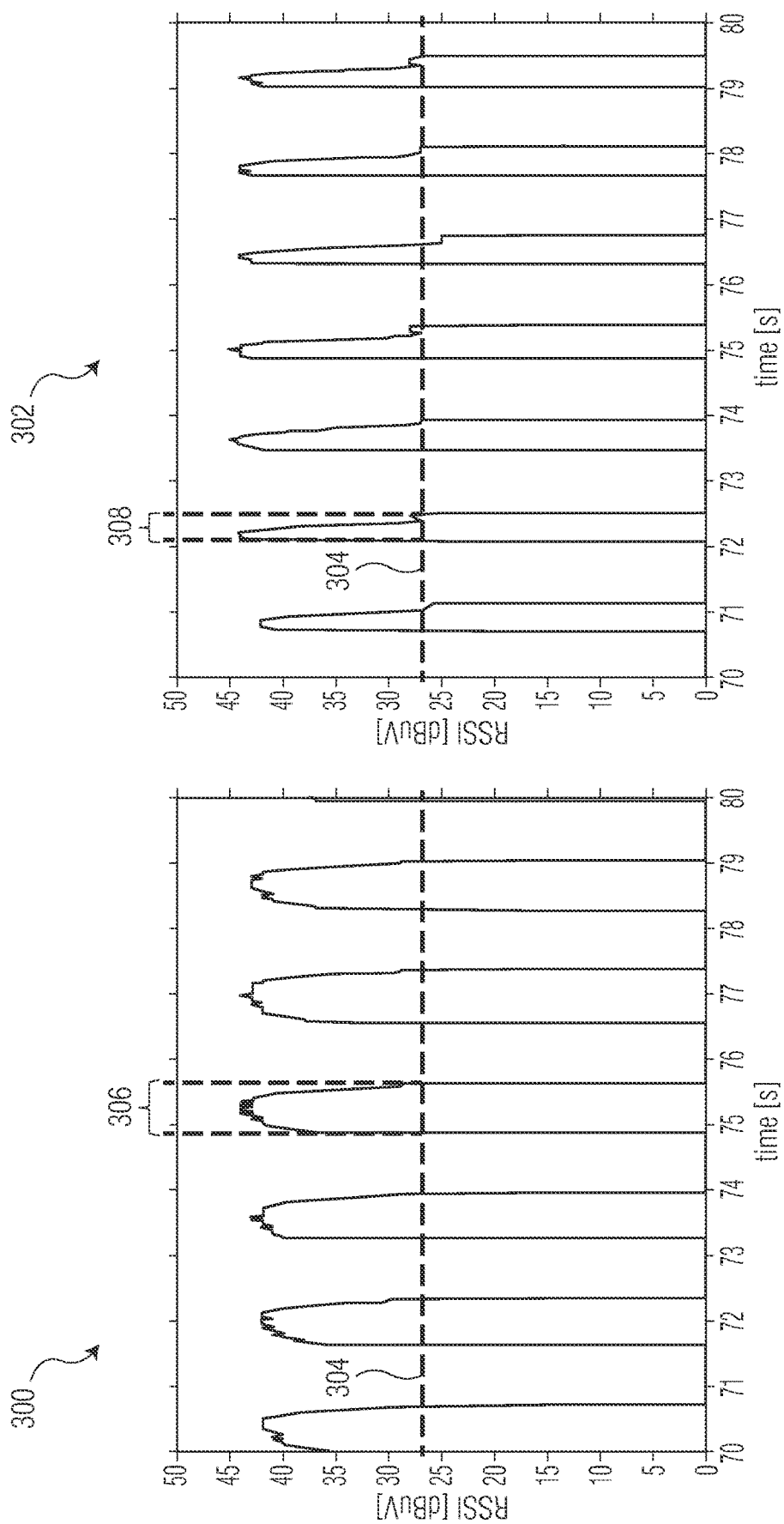
FIGS. 3A and 3B are example graphs of two different users having different near-field communications link characteristics even when wearing an identical set of near-field devices.

FIGS. 3A and 3B are example graphs of two different users having different near-field communications link characteristics 300, 302 even when wearing an identical set of near-field devices 100.

FIG. 3A is an example graph 300 of a Received Signal Strength RSS [dBuV] between a first pair of near-field devices 100 coupled to a first user while walking. FIG. 3B is an example graph 302 of a RSS between a second pair of near-field devices 100 coupled to a second user also while walking.

Each of the users wear a first device 100 at a left waist location and a second device 100 at a back side of their left lower leg. The RSS profile for the two users is unique to each user. An RSS threshold 304 of about 27 dBuV for the near-field communications link is set by the device controller 108. This results in a first near-field transmission window 306 (e.g. ON time) for the first user, and a second near-field transmission window 308 (e.g. ON time) for the second user.

Figure 4C:
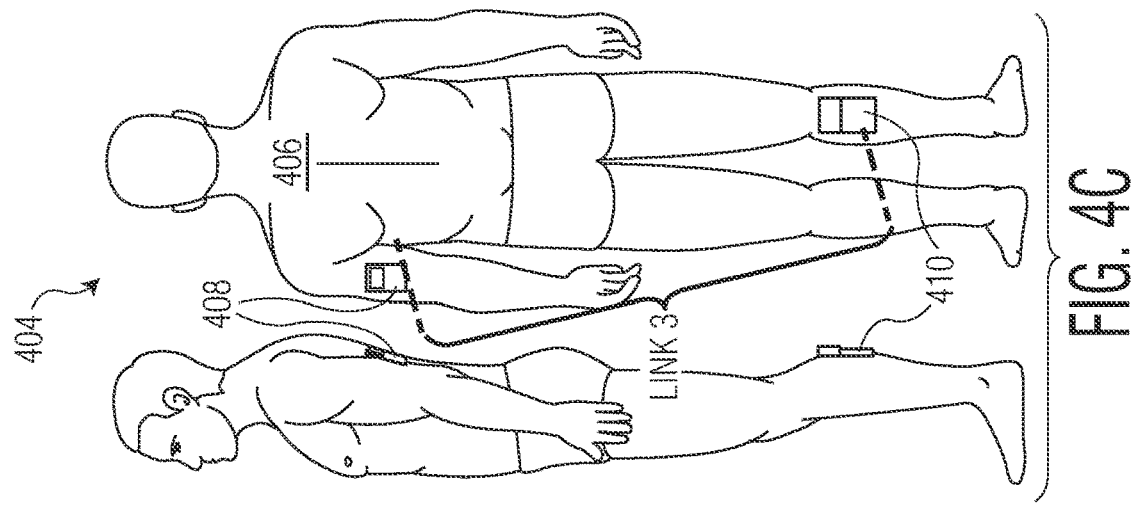
FIGS. 4A, 4B and 4C are example pictorial positionings of a pair of the near-field devices.
Figure 4B:
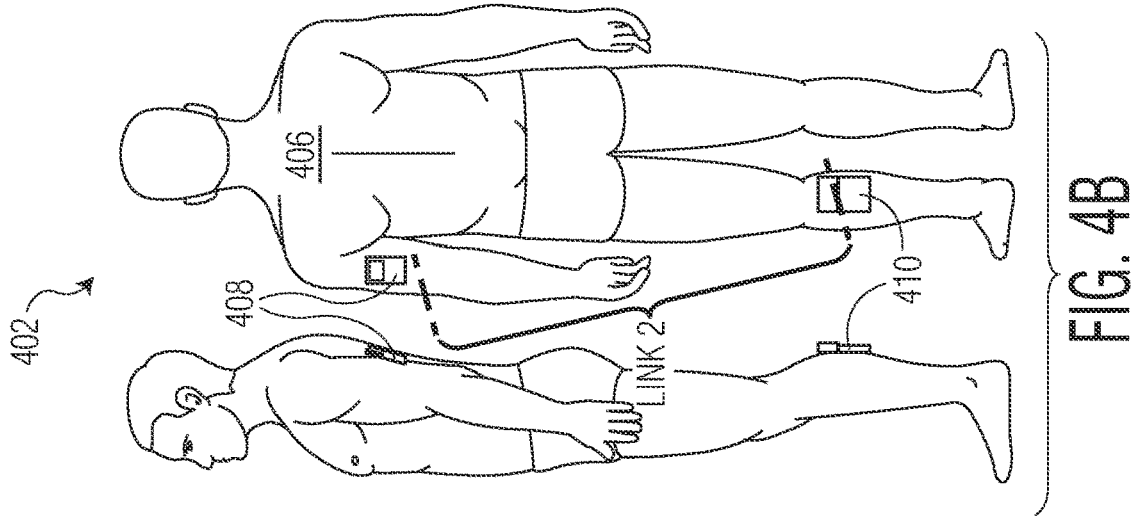
Figure 4A:
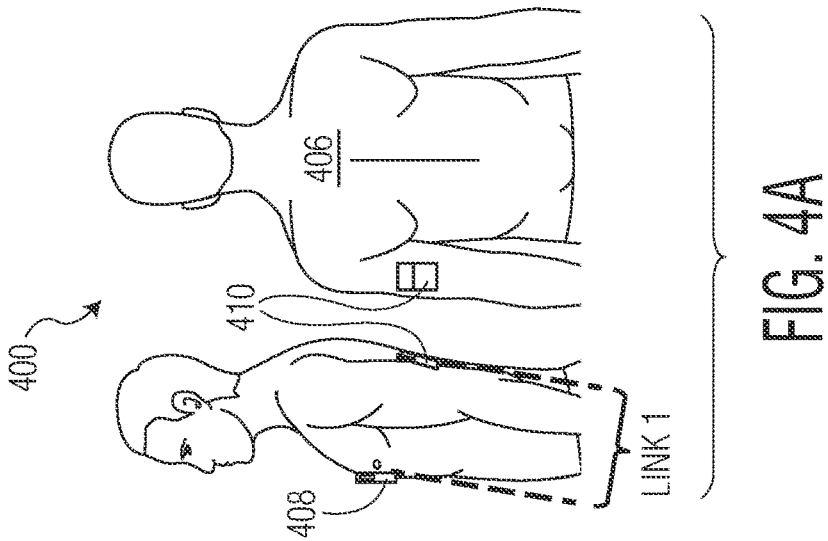

FIGS. 4A, 4B and 4C are example pictorial positionings 400, 402, 404 of a pair of the near-field devices 100.

Example 400 shows a user 406 having a first near-field device 408 positioned at a central chest location and a second near-field device 410 positioned at a back side of a left upper arm. This configuration creates a first near-field communications link (e.g. link 1).

Example 402 shows the user 406 having the first near-field device 408 positioned at a back side of a left upper arm and the second near-field device 410 positioned at the back side of a left lower leg. This configuration creates a second near-field communications link (e.g. link 2).

Example 404 shows the user 406 having the first near-field device 408 positioned at the back side of the left upper arm and the second near-field device 410 positioned at a back side of a right lower leg. This configuration creates a third near-field communications link (e.g. link 3).

The device controller 108 in at least one of the devices 100 creates User Profile Driven Channel Access (UPDCA)

models for each of these example positionings 400, 402, 404 as discussed above. In some example embodiments, a single pair of devices 100 store in memory UPDCA data for each of the example positionings 400, 402, 404 so that a single user 406 may reposition the devices 100 without needing to retrain the UPDCA models each time the device's 100 positions are switched.

Figure 5A:
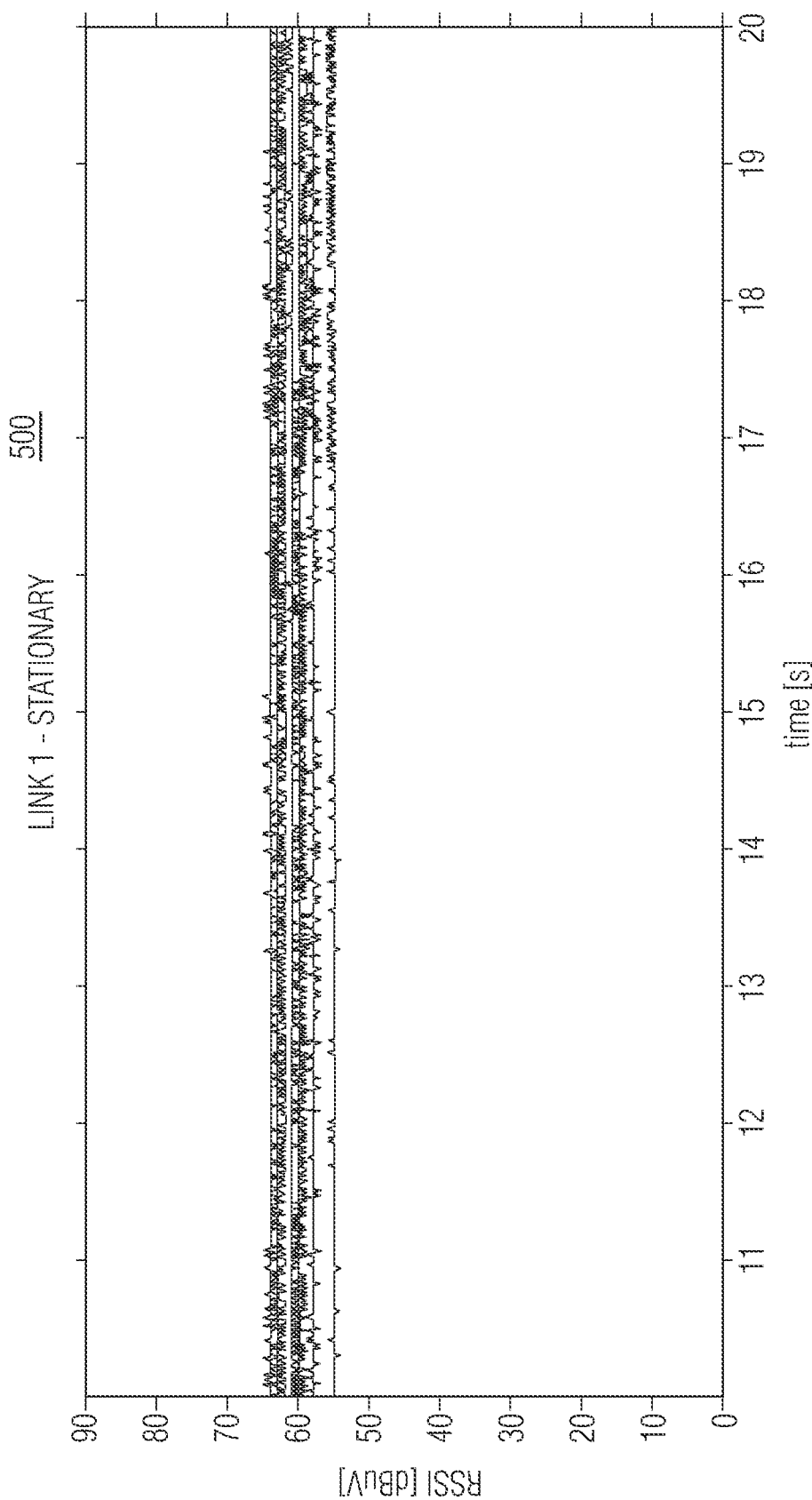
Figure 5B:
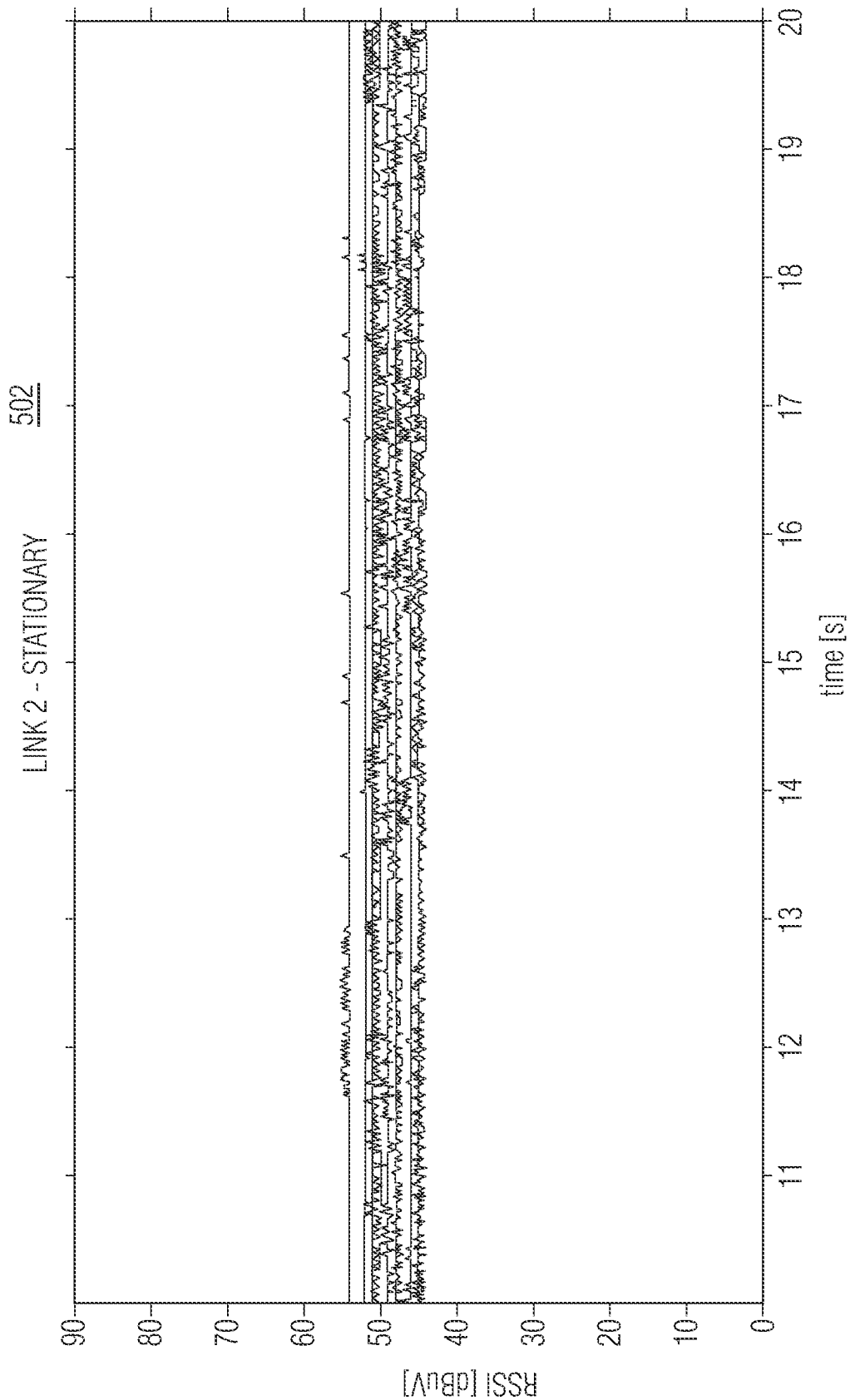

FIGS. 5A, 5B and 5C are example graphs of near-field communications link characteristics 500, 502, 504 corresponding to a set of stationary users wearing a pair of near-field devices 408, 410.

FIG. 5A is an example 500 shows RSS values for the first near-field communications link (e.g. link 1) verses time. Each set of graphed data corresponds to one user in a set of about twenty users wearing the first and second devices 408, 410, such as shown by user 406 in FIG. 4A.

FIG. 5B is an example 502 shows RSS values for the second near-field communications link (e.g. link 2) verses time. Each set of graphed data corresponds to one user in the set of about twenty users wearing the first and second devices 408, 410, such as shown by user 406 in FIG. 4B.

FIG. 5C is an example 504 shows RSS values for the third near-field communications link (e.g. link 3) verses time. Each set of graphed data corresponds to one user in the set of about twenty users wearing the first and second devices 408, 410, such as shown by user 406 in FIG. 4C.

These example characteristics 500, 502, 504 show a received voltage in dBuV when the users are stationary for an application with an operating frequency F=10.6 MHz for a bandwidth of 450 KHz and a transmitted voltage of 132 dBuV. In these measurements where the users are stationary, a mean received voltage VRx,1 for Link 1 is 61 dBuV, the mean received voltage VRx,2 for Link 2 and VRx,3 for Link 3 is 50 dBuV.

Figure 6A:
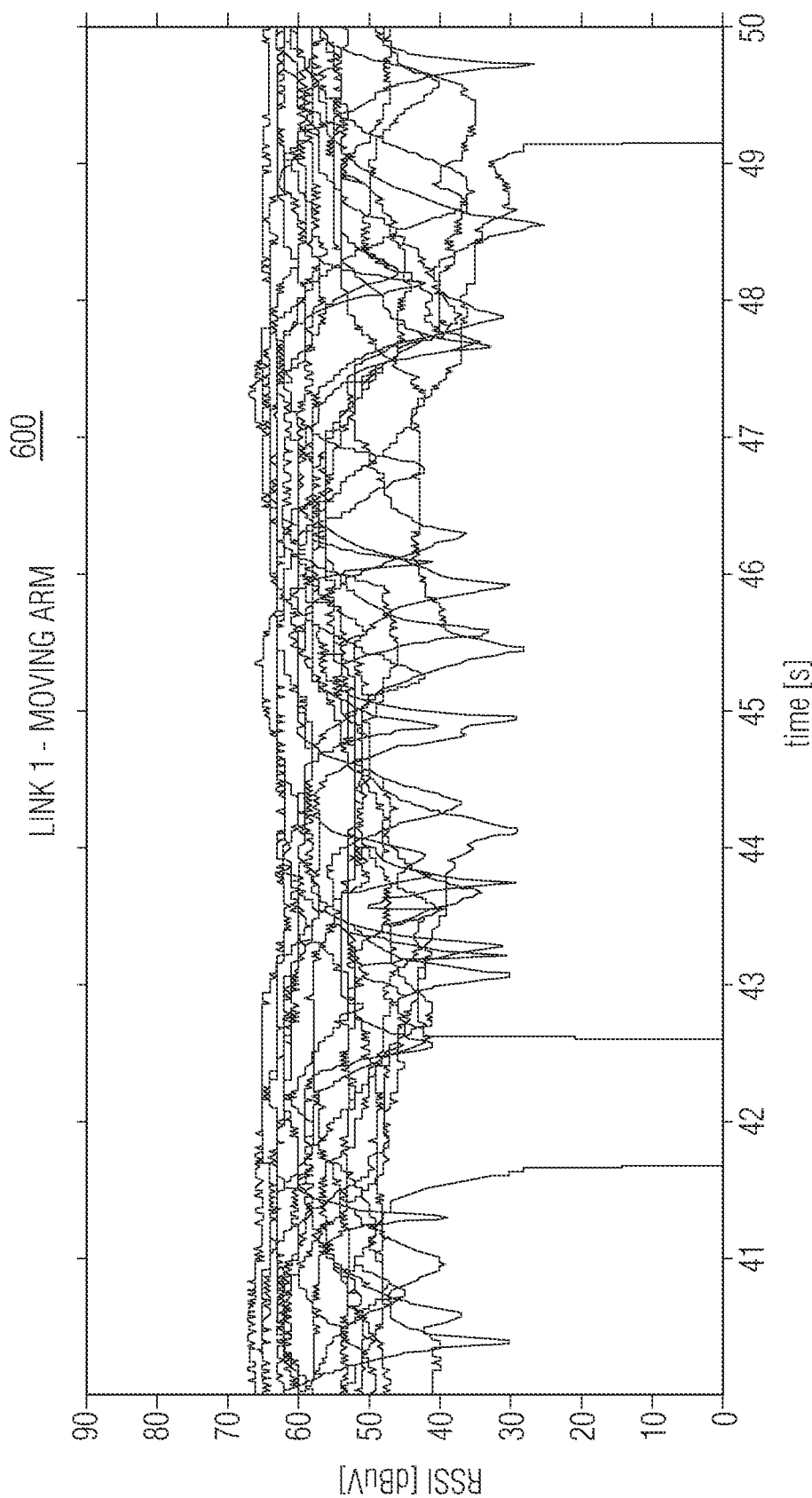
FIGS. 6A, 6B and 6C are example graphs of near-field communications link characteristics corresponding to a set of moving users wearing a pair of near-field devices.
Figure 6B:
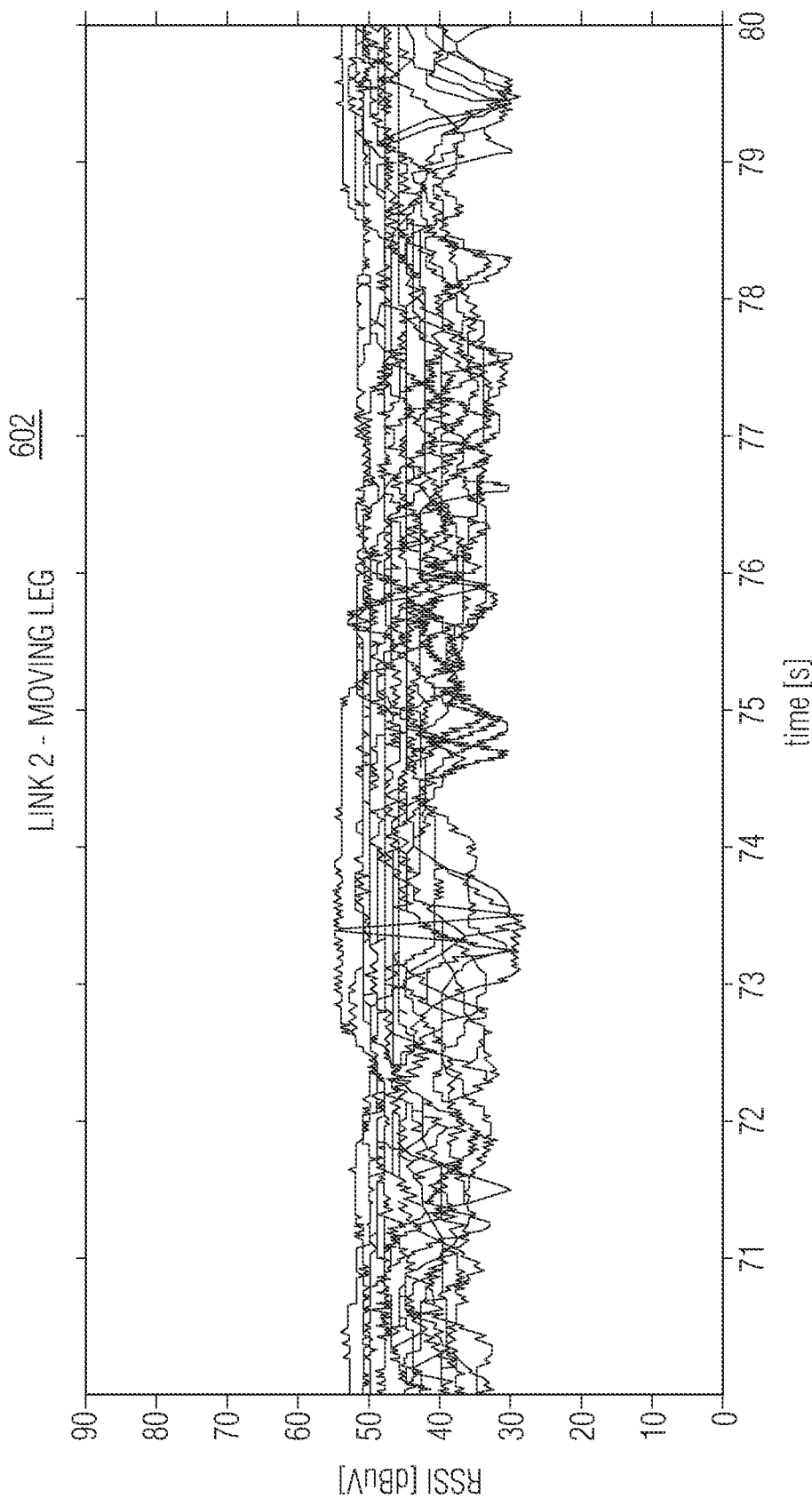
Figure 6C:
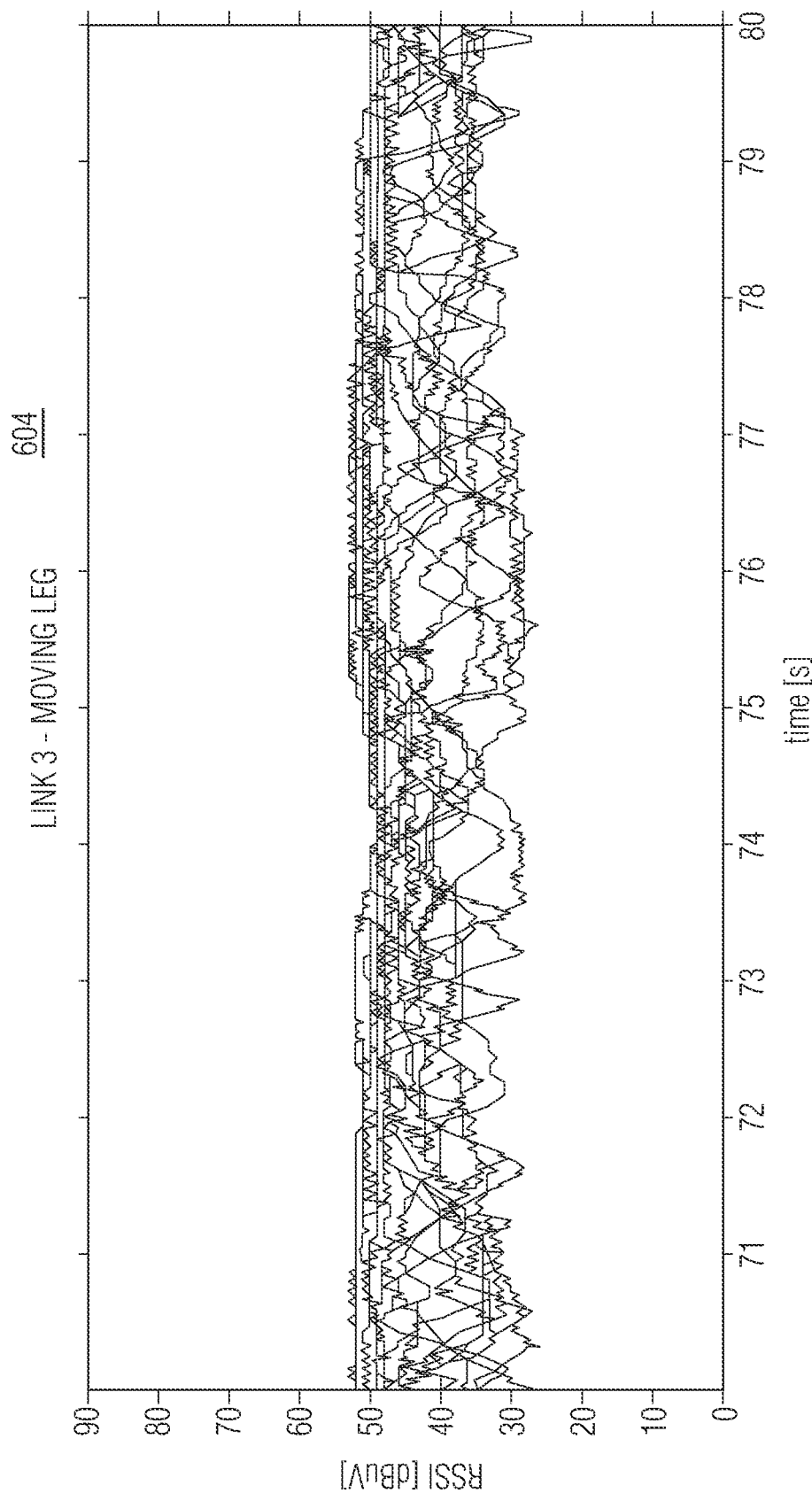

FIGS. 6A, 6B and 6C are example graphs of near-field communications link characteristics 600, 602, 604 corresponding to a set of moving users wearing a pair of near-field devices 408, 410.

FIG. 6A is an example 600 shows RSS values for the first near-field communications link (e.g. link 1) verses time. Each set of graphed data corresponds to one user in the set of about twenty users wearing the first and second devices 408, 410, such as shown by user 406 in FIG. 4A.

FIG. 6B is an example 602 shows RSS values for the second near-field communications link (e.g. link 2) verses time. Each set of graphed data corresponds to one user in the set of about twenty users wearing the first and second devices 408, 410, such as shown by user 406 in FIG. 4B.

FIG. 6C is an example 604 shows RSS values for the third near-field communications link (e.g. link 3) verses time. Each set of graphed data corresponds to one user in the set of about twenty users wearing the first and second devices 408, 410, such as shown by user 406 in FIG. 4C.

These example characteristics 600, 602, 604 show that when the users are performing a movement, a received signal strength fluctuates over time as the on-body channel is varying under these dynamics. The received voltage is in dBuV with an operating frequency F=10.6 MHz for a bandwidth of 450 KHz and a transmitted voltage of 132 dBuV.

In these examples 600, 602, 604, Link 1 is measured when the users are performing an arm movement, links 2 and 3 are measured when the users are performing a leg movement. Depending on how they move their arm or leg, each user defines his own signal strength over the course of the movement. For Link 1 there is one user that is confronted with link drops when he moves his arm. Other users each have their own RSS profile in time.

Figure 7:
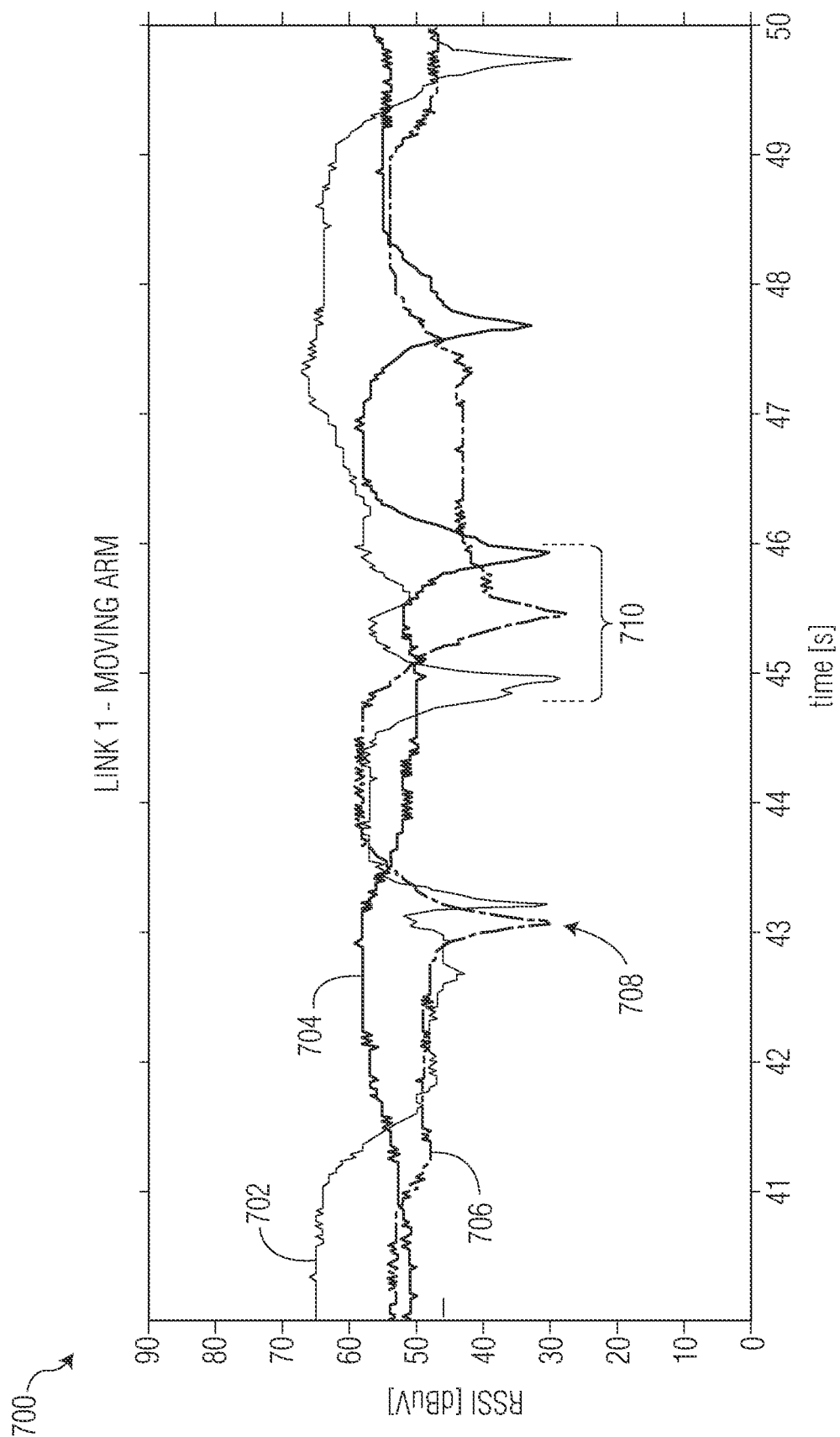
FIG. 7 is an example graph of near-field communications link characteristics corresponding to a set of three users moving their arms while wearing the first and second devices, such as shown by user in FIG. 4A and FIG. 6A.

FIG. 7 is an example graph of near-field communications link characteristics 700 corresponding to a set of three users 702, 704, 706 moving their arms while wearing the first and second devices 408, 410, such as shown by user 406 in FIG. 4A and FIG. 6A.

Ten seconds of the three user's 702, 704, 706 arm movements are shown. They generate somewhat similar RSS profiles (i.e. near-field communications link characteristics) characterized by at least two RSS dips to 30 dBuV a few seconds apart (i.e. 708, 710). Each user has their own dynamic RSS profile and timing (i.e. set of near-field communications link characteristics), which the device controller 108 algorithm learns and updates.

Suppose that in a situation (i.e. due to an external interference source present) where the sensitivity of the communication link is impacted and 30 dBuV is no longer sufficient to guarantee robust communication between these users 702, 704, 706, then at the two time instances 708, 710 where the RSS decreases to 30 dBuV, the link can experience a link drop.

However, since the device controller 108 is configured to define a near-field transmission window based on these monitored near-field communications link characteristics (i.e. RSS values), the device controller 108 will not command an attempt for near-field link reestablishment until after a first expected link drop 708 and before a second expected link drop 710. In terms of power consumption this is an advantage as the second drop would cause the link to break again and the devices 408, 410 having to re-establish the link again.

Figure 8:
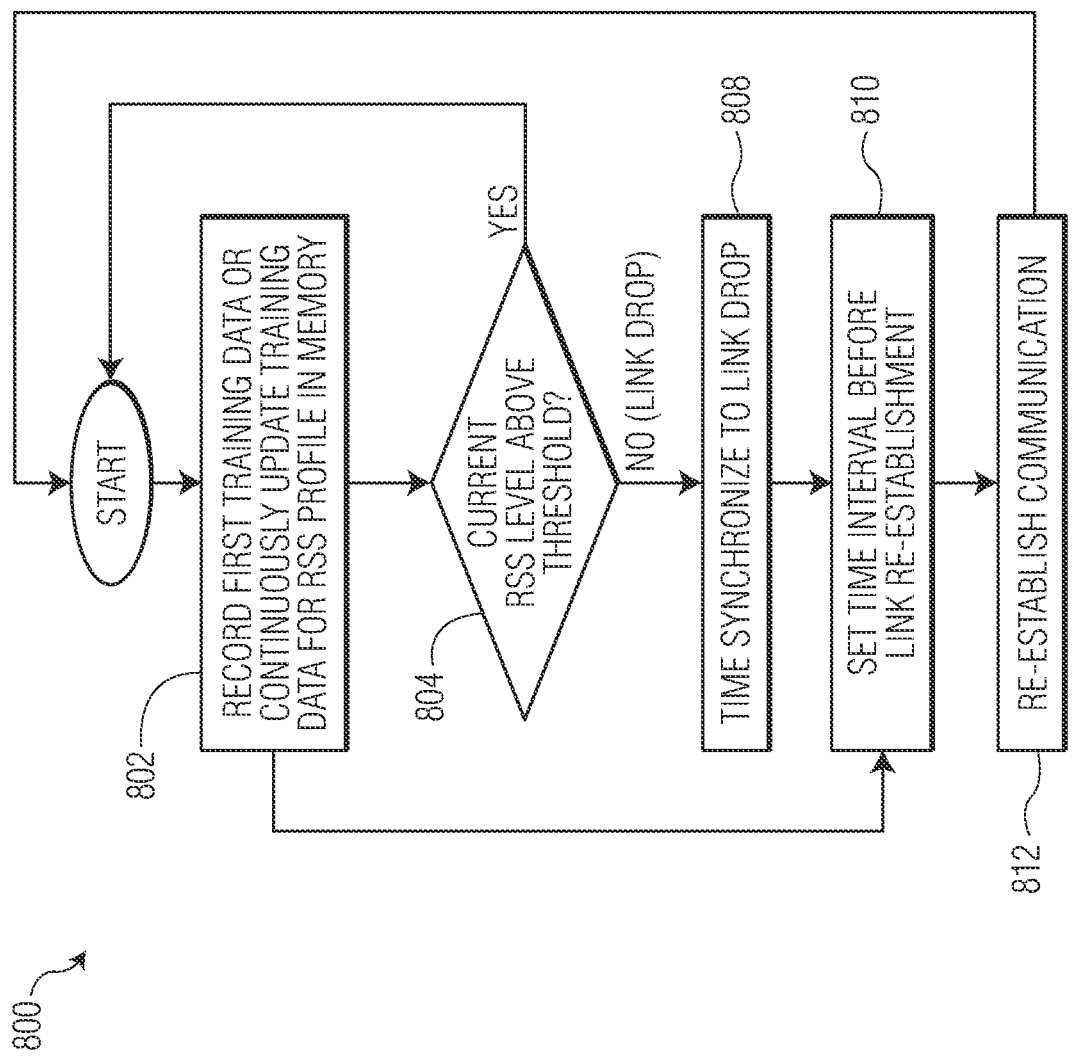
FIG. 8 shows an example set of instructions for configuring the near-field device to re-establish near-field communications after a near-field communication loss.

FIG. 8 shows an example 800 set of instructions for configuring the near-field device 100 to re-establish near-field communications after a near-field communication loss.

In step 802, record a first training data set of RSS near-field communications link characteristic profile data between a pair of near-field devices 100. In step 804, check if a current RSS level is above a threshold RSS level. In step 806, if the RSS level is above the threshold, update the recorded training data set. In step 808, if the RSS level is not below threshold (e.g. a link drop), a time of onset of the link drop is synchronized to a predefined and stored time delay interval 810 (i.e. near-field transmission window) before link re-establishment is attempted. This time delay interval is derived from the RSS training data set stored in memory. In step 812, the communication can be re-established.

Example applications of the near-field device 100 include various wireless on-body networks that require a small form factor. Medical applications, for example glucose monitoring system that is worn on-body. A glucose sensor measures the glucose level in the blood at some position on the body and transfers this value with near fields to the insulin pump also worn on-body or in close proximity to the body. Other applications include: a robot (e.g. collaborative), a vehicle (e.g. V2X navigation), a docking system, a physical coupling system, a ticketing station, a security portal, and/or an assembly line device.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first near-field device, comprising:
   a controller configured to establish a near-field wireless communications link with a second near-field device;
   wherein the controller is configured to monitor a received wireless signal characteristic of the near-field wireless communications link;
   wherein the controller is configured to define a near-field wireless transmission window based on the monitored received wireless signal characteristic;
   wherein the controller is configured to delay wireless transmission of a set of near-field signals to the second near-field device if a current time is not within the near-field wireless transmission window;
   wherein the controller is configured to be coupled to a front-end portion configured to translate controller communications into the near-field signals exchanged with the second near-field device;
   wherein the front-end portion includes,
   a near-field antenna having a first conductive surface and a second conductive surface; wherein the conductive surfaces are configured to carry non-propagating quasi-static near-field electric-induction (NFEI) signals exchanged within the near-field communications link; and
   a tuning circuit coupled to the near-field antenna and having a set of tuning parameters and configured to adjust a resonant frequency and bandwidth of the near-field antenna.

2. The device of claim 1:
   wherein the controller is configured to define the window as a time period when the near-field communications link characteristic is above a threshold near-field communications link characteristic.

3. The device of claim 1:
   wherein the controller is configured to define the window as a time period when the controller predicts that the near-field communications link characteristic will be above a threshold near-field communications link characteristic.

4. The device of claim 1:
   wherein the controller is configured to define the window as a time period corresponding to a user movement when the near-field communications link characteristic was above a threshold near-field communications link characteristic.

5. The device of claim 4:
   wherein the controller is configured to extract a set of features from the near-field communications link characteristic within the time period.

6. The device of claim 5:
   wherein at least one of the features is a trigger feature found at a beginning of the time period.

7. The device of claim 6:
   wherein the controller is configured to use the trigger feature to phase align the window with a beginning of the user movement.

8. The device of claim 1:
   wherein the controller is configured to monitor the near-field communications link characteristic of the near-field communications link as a user moves.

9. The device of claim 8:
wherein the controller is configured to map variations in the near-field communications link characteristic to a specific type of user behavior.

10. The device of claim 9:
wherein the specific type of user behavior is at least one of: walking, moving arms, moving head, moving fingers, bending, stretching, jumping, swimming, rotating, swinging, holding a posture, meditating, or moving in relation to another user.

11. The device of claim 8:
wherein the controller is configured to instruct the user to perform the specific type of user behavior.

12. The device of claim 1:
wherein the received wireless signal characteristic of the near-field wireless communications link is a received wireless signal strength (RSS).

13. The device of claim 1:
wherein the characteristic of the near-field communications link is at least one of: a tuning parameter of the tuning circuit in the near-field device, data throughput in the near-field communications link, or a number of lost data packets in the near-field communications link.

14. The device of claim 1:
wherein the controller is configured to place the first near-field device in a low-power state if the current time is not within the near-field transmission window; and
wherein the controller is configured to take the first near-field device out of the low-power state if the current time is within the near-field transmission window.

15. The device of claim 1:
wherein the first near-field device includes a transceiver coupled to the controller and configured to transmit the set of near-field signals;
wherein controller is configured to command the transceiver to not transmit the set of near-field signals if the current time is not within the near-field transmission window; and
wherein the controller is configured to command the transceiver to transmit the set of near-field signals if the current time is within the near-field transmission window.

16. The device of claim 1:
wherein the first near-field device includes a power controller coupled to the controller and coupled to a power source;
wherein power controller is configured to turn-off the first near-field device if the current time is not within the near-field transmission window; and
wherein the power controller is configured to turn-on the first near-field device if the current time is within the near-field transmission window.

17. The device of claim 1:
wherein the first device and the second device are coupled to a single user.

18. The device of claim 1:
wherein the first device is coupled to a first user and the second device is coupled to a second user.

19. The device of claim 1:
wherein a center frequency of the near-field communications link is fixed.

20. The device of claim 1:
wherein the first near-field device further includes the front-end portion,
the near-field antenna; and
the tuning circuit.

21. The device of claim 1:
wherein the
near-field antenna includes a coil;
wherein the coil is configured to carry non-propagating quasi-static near-field magnetic-induction (NFMI) signals exchanged within the near-field communications link.

22. The device of claim 1:
wherein the user is at least one of: a robot, a vehicle, a docking system, a physical coupling system, a ticketing station, a security portal, and/or an assembly line device.

23. The device of claim 1:
wherein the near-field device is embedded in at least one of: a vehicle, a game controller, an amusement park ride, a medical device, an industrial station, or a robotic device.

24. A first near-field device, comprising:
a controller configured to establish a near-field communications link with a second near-field device;
wherein the controller is configured to monitor a characteristic of the near-field communications link;
wherein the controller is configured to define a near-field transmission window based on the monitored characteristic; and
wherein the controller is configured to delay transmission of a set of near-field signals to the second near-field device if a current time is not within the near-field transmission window;
wherein the first near-field device further includes a front-end portion configured to translate controller communications into the near-field signals exchanged with the second near-field device; and
wherein the front-end portion includes,
a near-field antenna having a first conductive surface and a second conductive surface;
wherein the conductive surfaces are configured to carry non-propagating quasi-static near-field electric-induction (NFEI) signals exchanged within the near-field communications link; and
a tuning circuit coupled to the near-field antenna and having a set of tuning parameters and configured to adjust a resonant frequency and bandwidth of the near-field antenna.

25. A first near-field device, comprising:
a controller configured to establish a near-field wireless communications link with a second near-field device;
wherein the controller is configured to monitor a received wireless signal characteristic of the near-field wireless communications link;
wherein the controller is configured to define a near-field wireless transmission window based on the monitored received wireless signal characteristic;
wherein the controller is configured to delay wireless transmission of a set of near-field signals to the second near-field device if a current time is not within the near-field wireless transmission window;
wherein the first near-field device further includes a front-end portion configured to translate controller communications into the near-field signals exchanged with the second near-field device; and
wherein the front-end portion includes,
a near-field antenna having a first conductive surface, a second conductive surface and a coil;
wherein the conductive surfaces are configured to carry non-propagating quasi-static near-field electric-induction (NFEI) signals exchanged within the near-field communications link;
wherein the coil is configured to carry non-propagating quasi-static near-field magnetic-induction (NFMI) signals exchanged within the near-field communications link; and
a tuning circuit coupled to the near-field antenna and having a set of tuning parameters and configured to adjust a resonant frequency and bandwidth of the near-field antenna.

* * * * *